United States Patent [19]

Linares et al.

[11] 3,950,271

[45] Apr. 13, 1976

[54] NUCLEAR SHIELDS

[75] Inventors: Robert C. Linares, Warren Township, Somerset County; Louis F. Nienart, Elizabeth, both of N.J.; George A. Toelcke, Sandy, Utah

[73] Assignee: Allied Chemical Corporation, New York, N.Y.

[22] Filed: Apr. 26, 1974

[21] Appl. No.: 464,605

[52] U.S. Cl. .............................. 252/478; 260/42.27
[51] Int. Cl.² ........................................ G21F 1/10
[58] Field of Search .................. 260/42.27; 252/478

[56] References Cited

UNITED STATES PATENTS 3,000,802  9/1961  Worn et al. .......................... 252/478

*Primary Examiner*—Stephen C. Bentley
*Attorney, Agent, or Firm*—Arthur J. Plantamura; Ellen T. Dec

[57] ABSTRACT

Melt-processable nuclear shielding compositions are prepared from chloro-fluoro substituted ethylene polymers, particularly PCTFE and E-CTFE, containing 1–75% by weight of a gadolinium compound.

13 Claims, No Drawings

NUCLEAR SHIELDS

BACKGROUND OF THE INVENTION

I. Field of the Invention

Superior nuclear shields may be constructed from gadolinium filled chloro-fluoro substituted ethylene polymers, particularly filled ethylene-chlorotrifluoroethylene or filled polychlorotrifluoroethylene. The fillers used in conjunction with these polymers comprise gadolinium compounds, preferably compounds such as gadolinium boride, gadolinium oxide, gadolinium aluminate and gadolinium aluminum borate.

II. Brief Description of the Prior Art

Nuclear shields which are intended to absorb neutrons are usually made from boron compounds such as elemental boron, boron oxide, boron carbide, etc. These compounds are usually refractory in nature, brittle and difficult or expensive to produce in precise or odd shapes. Recent attempts to use these boron compounds as fillers in plastics or glass have met with mixed results. In the case of glass artifacts, particularly borosilicate glass Raschig rings, the fragile nature of the glass as well as difficulty in processing tends to reduce any inherent advantages. The use of fluorine substituted polymers has been proposed since plastics are easier to process than glass; however, some of these fluorine substituted compounds, particularly polytetrafluoroethylene (PTFE), cannot be melt processed using conventional techniques and instead require special molding and extrusion methods consisting of formulating the granular plastic powder into the desired part under pressure and then sintering below the melt temperature to coalesce the particles. Moreover, the resulting fluorine-substituted polymeric compositions exhibit poorer properties when filled and degrade when exposed to radiation. Additionally, for many applications where the artifacts are to be exposed to high radiation dosages, it is necessary to employ a large amount, i.e., greater than 10% filler in the plastic materials. Such materials containing these large amounts of boron are extremely difficult to extrude and/or mold and cause significant wear on the processing equipment. Moreover, the conditions under which the neutron absorbers function must be considered. Since such artifacts, e.g. Raschig rings, are subjected to high amounts of degrading radiation and are often required to operate in acidic or other highly corrosive environments, the lifetime of most such fluorine substituted plastic or glass filled artifacts will be substantially reduced due to degrading of the glass or plastic and leaching of the filler. In addition to the problems caused by leaching of filler or plastic, many of the proposed plastics, such as polyvinylidine fluoride and polyvinyl chloride, absorb undue amounts of acid causing swelling and subsequent reduction in performance of the resulting product. Furthermore, in the case of glass Raschig rings, the relatively large amount of breakage, compounded by the leaching of filler material, results in a relatively short life for the ring. Subsequently, it is necessary to periodically dispose of large quantities of broken or otherwise unserviceable radioactive Raschig rings.

There is also a need in the art for materials suitable for use in pipes, blow molded or roto-molded vessels, etc. to be used for transporting or containing radioactive material. The materials required for such applications would have to exhibit the same properties as previously described, i.e. they would have to possess high neutron absorbing properties, be easily processable and not subject to degradation in radioactive or acidic envirornments. Moreover, although many applications deal with only thermal neutrons, i.e. neutrons which are of relatively low energy such as are given off as a consequence of natural radioactive decay, there are an increasing number of cases, such as in breeder reactors or nuclear weapons, where it may be desirable to eliminate certain atoms, particularly hydrogen, from the plastic polymer in order to prevent their participation in a nuclear reaction.

There is thus a need for easily processable, corrosion resistant effective nuclear shielding materials which can be highly filled without brittleness or loss in mechanical properties and which will maintain their superior properties even after exposure to intense radiation and/or highly acidic environments.

SUMMARY OF THE INVENTION

This invention discloses novel melt processable compositions having a shielding effect against neutron radiation comprising a chloro-fluoro substituted ethylene polymer having distributed therethrough and intimately admixed therewith from about 1 to about 75% by weight of a gadolinium compound. Accordingly, we have found that such compositions possessing a unique combination of properties heretofore unattainable in compositions suitable for use in nuclear shielding applications, may be prepared by incorporating up to about 75% by weight gadolinium compounds in chloro-fluoro substituted ethylene polymer compositions, particularly in ethylenechlorotrifluoroethylene (E-CTFE) polymers and polychlorotrifluoroethylene PCTFE polymers. The resulting compositions of matter are easily processable, chemically inert to acidic environment, mechanically strong and shock resistant. An additional feature of these novel compositions is that not only are the shielding properties of these polymers highly resistant to the degrative effects of radiation, but that the radiation induces cross-linking and thus enhances the mechanical properties of the polymers.

This invention also discloses shaped articles of manufacture having a shielding effect against neutron radiation comprising a melt-processed chloro-fluoro substituted ethylene polymer having distributed therethrough and intimately admixed therewith from about 1 to about 75% by weight of a gadolinium compound. The articles are useful in a large number of applications such as for Raschig rings or similar packing devices for criticality control; pipes, blow-molded or roto-molded containers for plutonium or uranium solutions; as intricate molded parts for reactors or other nuclear devices; or as lightweight portable neutron absorbing structures or shields, etc. The compositions of the present invention can also be spun into filaments or a melt thereof coated onto filaments and loomed into fabric for neutron absorbing clothing or the like. These materials, it is thus seen, may be tailored in accordance with the desired end-use. For example, in cases where they will be exposed to fast moving neutrons, the gadolinium filled E-CTFE composition provides a high hydrogen content for attenuating these neutrons. However, in cases such as in breeder reactors, wherein the presence of hydrogen is detrimental, the gadolinium filled PCTFE composition is appropriate.

DESCRIPTION OF THE PREFERRED EMBODIMENT

The thermoplastic chloro-fluoro substituted ethylene polymers containing the gadolinium compounds which may be used in these applications include particularly ethylene chlorofluoroethylene and polychlorotrifluoroethylene and blends containing more than 50% of such polymers.

Polychlorotrifluoroethylene (PCTFE) polymer is flexible, moldable, and radiation resistant. It is non-flammable in air, has good abrasion resistance and good mechanical properties. Additionally, the polymer is chemically resistant to organic solvents and oxidizing mineral acids. Moreover, its resistance to permeability of water vapor and other molecules is better than other known polymers.

The preferred polymer ethylene chlorotrifluoroethylene, is useful wherever high concentrations of hydrogen are acceptable. The E-CTFE polymer possesses the mechanical strength, chemical resistance, and non-flammability of the PCTFE polymer. In addition to these characteristics, it has been found that the E-CTFE composition is easily melt processed and moreover the mechanical properties thereof may be improved by cross-linking upon exposure to radiation, thus making this polymer a composition valuable for nuclear shielding operations.

The particular gadolinium compound used as filler in the novel nuclear shielding compositions of the present invention to some extent may depend upon the polymer which is to be filled and the environment in which the shield is to be used. In the invention, any of a variety of available gadolinium compounds may be used. Preferred gadolinium compounds include gadolinium boride, gadolinium oxide, gadolinium aluminate, and gadolinium aluminum borate. These compounds exhibit excellent nuclear absorption as indicated in Table I which lists the nuclear absorption per gram relative to boron.

Table I

| Compound | Nuclear Absorption/gm. |
| --- | --- |
| Boron | 1.0 |
| Gadolinium boride | 3.26 |
| Gadolinium oxide | 3.63 |
| Gadolinium aluminate | 2.71 |
| Gadolinium aluminum borate | 1.47 |

It is obvious from Table I that great weight-cost savings or increased shielding can be obtained by using the gadolinium compounds. Moreover, since gadolinium has a much higher density than boron, the neutron absorption per unit volume will be much higher than if boron compounds were used.

The amount of the gadolinium compound employed is dependent upon the particular gadolinium compound, the particular polymer, and the amount of radiation to which it will be subjected. In general, amounts of about 1 to 75 weight % preferably about 7.5 to about 60% are employed. Specifically, in the case of E-CTFE polymer filled with gadolinium oxide, amounts of 7.5 to about 25% of the gadolinium filler are preferred. For similar gadolinium oxide filled PCTFE polymer, the preferred amount of filler ranges from about 25 to about 60%. The particular size of the gadolinium fillers used to produce the novel shielding composition should preferably be within the range of about $0.1\mu$ to $70\mu$, preferably from about $3\mu$ to about $40\mu$.

An additional advantage to the use of these gadolinium filled chloro-fluoro substituted ethylene polymers in nuclear shielding artifacts is that not only does the neutron absorbing capacity of the resulting composition increase, but the flexural strength and modulus also increase as the amount of filler is increased.

Moreover, due to the unique properties of the chlorofluoro compounds, it is possible to load these compositions to an extremely high degree, i.e. in some cases up to about 45% by volume, and still be able to process the composition in conventional extrusion or injection molding equipment.

The gadolinium compounds may be incorporated into the chloro-fluoro substituted ethylene compositions using any conventional mechanical blending techniques.

The resulting filled compositions can be easily fabricated into the desired nuclear shielding devices. By way of illustration, the filled polymer could be extruded into tubing and cut and shaped into Raschig rings.

Similarly, the filled composition could be extruded to form piping. Alternatively, the inner or outer surfaces of metal pipes or tubes could be readily coated with the molten filled composition which upon quenching would provide superior radiation shielding.

The filled composition could also be blow-molded or rotomolded to produce containers or vessels for radioactive materials or could be compressed and injection molded into intricate parts for reactors or other nuclear devices. Additionally, the filled composition could be melt processed to produce fibers and then fabricated into protective clothing.

The PCTFE polymers used herein are commercially known and available materials which may be prepared by a variety of methods such as by the polymerization of chlorotrifluoroethylene in the presence of an initiator.

The ethylene chlorotrifluoroethylene copolymers are also known, commercially available materials. These E-CTFE thermoplastic polymers are normally solid, contain between 40 and 60 mol percent, preferably 45 to 55 mol percent, ethylene units and have a melting point above about 200°C. preferably between about 220° and 265°C. These copolymers may be prepared by processes well known to those skilled in the art, as described, for example, in Hanford U.S. Pat. Nos. 3,371,076 and 3,501,446 in *Nucleonics*, Sept., 1964, pp. 72–74 and in British Pat. No. 949,422.

Moreover, it has been found that these E-CTFE copolymer systems may be stabilized and rendered melt processable by the addition of anti-oxidants which function to prevent rapid increase in viscosity. It is also desirable to add 0.1 to 30% of an acid scavenger which acts to neutralize any acidic gases which may be liberated during radiation or other processing operations and which cause odor emission and bubble formation. Useful acid scavengers include the oxides of any metal in Group II of the Periodic Table. Depending upon the desired application, it may also be desirable to add 0.1 to 5% of a radiation cross-linking promoter triallylisocyonate, triallycyanurate, triallylphosphate, diallylfumatates, diallyisophthalate, diallylterephthalate, and the like.

According to the method of the present invention, these and any other additives can be added separately or be mixed prior to addition and may be added in solution or be dry blended with the chloro-fluoro substituted ethylene copolymer and gadolinium compound. Liquid or soluble additives containing no hydroxyl groups, such as ketones and ethers, as well as with non-polar aliphatic or aromatic solvents, such as hexane, heptane or toluene, and be sprayed onto the polymer if in finely divided form in conventional tumbling or blending devices. For molding operations, such as extrusion or injection molding, the blended mixture may be passed through an extruder and the extruded rod chopped into pellets of desired size. Alternatively, the additives and gadolinium compounds may be admixed with the copolymer by tumbling pellets of the copolymer, adding liquid additives, tumbling again to distribute the liquid additives, then adding the dry additives and gadolinium compound continuing tumbling to distribute the dry components evenly over the surface of the pellets, and then extruding the resultant mixture to intimately blend the reactants. Alternatively, the PCTFE or E-CTFE copolymer system may be prepared and the gadolinium compounds incorporated under pressure thereto.

The invention will be further described in the following examples:

EXAMPLE 1

An E-CTFE resin containing 98.05 weight % of approximately equimolar ethylene and chlorotrifluoroethylene, 1.0% trialkylisocyanurate, 0.3% of a phosphite of a stearically hindered phenol, 0.15% distearylthiodiproprionate and 0.5% calcium oxide was ball blended with 20 weight % gadolinium oxide of average particle size 10 $\mu$ and compression molded into plaques 2 × 2 in. × ¼ inch. These plaques were divided into three groups and each group exposed to concentrated nitric acid containing 0.5N HF. In one case, the nitric acid was boiled, in another the mixture run hot and the third group was kept at room temperature. After five weeks all samples were weighed and examined and found to have suffered no weight change and no degradation. Similarly, exposure to high degrees of radiation for an extended period of time resulted in no degradation. These results indicate that this gadolinium filled composition would be superior for use as Raschig rings, containers, pipes or in other applications requiring exposure to acidic and/or radioactive environments.

EXAMPLE 2

The procedure of Example 1 was repeated using a PCTFE resin and resulted in a composition possessing similar properties on exposure to acidic and radioactive environments.

EXAMPLES 3 – 5

The procedure of Example 1 was repeated using equivalent amounts of gadolinium boride, gadolinium aluminate and gadolinium aluminum borate. Again superior results were obtained.

EXAMPLES 6 – 19

In order to show that these chloro-fluoro substituted ethylene compositions can be highly filled with gadolinium compounds and still retain superior mechanical properties, the following experiments were performed:

The filling procedure of Example 1 was repeated to fill both E-CTFE and PCTFE resins, using filler in amounts of 1 ½, 10, 25, 50, 75 and 90 weight percent. Composite test plaques were molded under 300 psi pressure and at temperature of 260°C. for 20 minutes. Molding pressures were increased to 10,000 psi for PCTFE samples containing 75 weight percent filler. The mechanical properties of these plaques were tested with both polymers using flexural strength as the criterion. The results of these tests are tabulated in Table I.

Table I

| Mechanical Properties of Polymers Filled with Gadolinium Oxide | | | | |
|---|---|---|---|---|
| Wt.% In E-CTFE | Vol. % $Gd_2O_3$ | Bulk Measured Density | Flexural Stress at 1% Strain (psi) | Flexural Modulus (psi) |
| 0 | 0 | 1.69 | 2010 | $2 \times 10^5$ |
| 1.5 | .4 | 1.705 | 2000 | $2.1 \times 10^5$ |
| 10 | 2.47 | 1.832 | 2210 | $2.2 \times 10^5$ |
| 25 | 7.05 | 2.12 | 2570 | $2.7 \times 10^5$ |
| 50 | 18.5 | 2.74 | 4160 | $4.3 \times 10^5$ |
| 75 | 40.7 | 3.92 | 6500 (max) | $8.2 \times 10^5$ |
| In PCTFE | | | | |
| 0 | 0 | 2.15 | 1540 | $1.8 \times 10^5$ |
| 1.5 | .5 | 2.17 | 2040 | $1.6 \times 10^5$ |
| 10 | 3.1 | 2.31 | 2220 | $2.1 \times 10^5$ |
| 25 | 8.8 | 2.60 | 2580 | $2.7 \times 10^5$ |
| 50 | 22.5 | 3.29 | 4390 | $4.4 \times 10^5$ |
| 75 | 46.5 | 3.74 | 7830 | $10.8 \times 10^5$ |

We claim:

1. A melt processable composition having a shielding effect against neutron radiation comprising a chlorofluoro substituted ethylene polymer having distributed therethrough, and intimately admixed therewith, from about 1 to about 75% by weight of a gadolinium compound.

2. The composition of claim 1 wherein the polymer is ethylene chlorotrifluoroethylene copolymer.

3. The composition of claim 1 wherein the polymer is polychlorotrifluoroethylene.

4. The composition of claim 1 wherein the gadolinium compound is gadolinium oxide.

5. The composition of claim 1 wherein the gadolinium compound is present in amounts of from about 7.5 to about 60% by weight of the total composition.

6. The composition of claim 1 comprising ethylene-chlorotrifluoroethylene containing from about 7.5 to about 25 weight percent gadolinium oxide.

7. The composition of claim 1 comprising polychlorotrifluoroethylene containing from about 25 to about 60 weight percent gadolinium oxide.

8. The composition of claim 1 wherein the gadolinium compounds possess particle sizes within the range of 0.1 to 70$\mu$.

9. A shaped article of manufacture having a shielding effect against neutron radiation comprising a melt-processed chlorofluoro substituted ethylene polymer having distributed therethrough and intimately admixed therewith from about 1 to about 75% by weight of a compound of gadolinium.

10. The article of claim 9 in the form of a Raschig ring.

11. The article of claim 9 in the form of a pipe.

12. The article of claim 9 in the form of a blow-molded or roto-molded vessel.

13. The article of claim 9 in the form of a filament.

* * * * *